Sept. 17, 1957  E. D. WALKER  2,806,510
SEAT-BED
Filed May 18, 1956  3 Sheets-Sheet 1

INVENTOR.
EUGENE D. WALKER.
BY Cullen & Canton
Attorneys

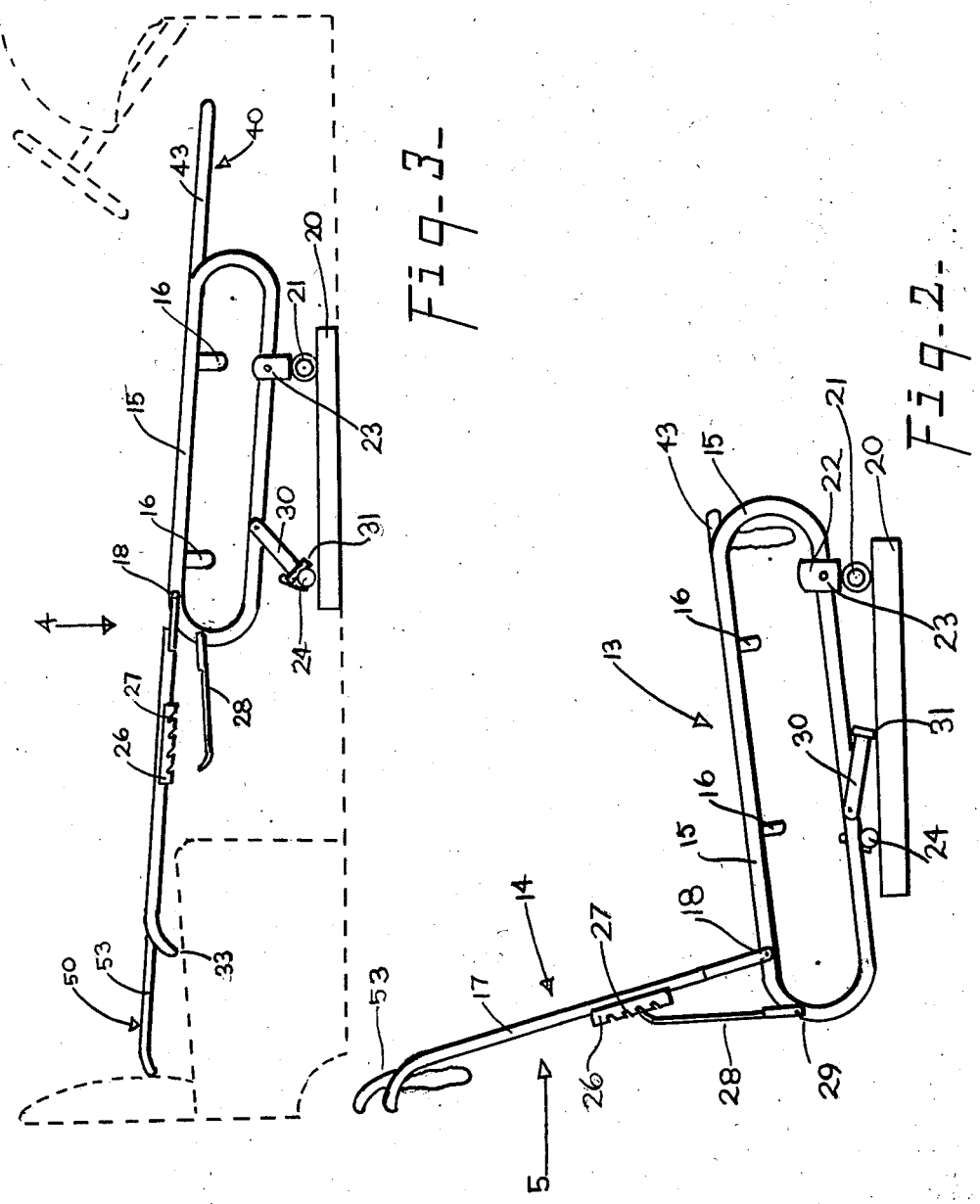

Sept. 17, 1957   E. D. WALKER   2,806,510
SEAT-BED
Filed May 18, 1956   3 Sheets-Sheet 3
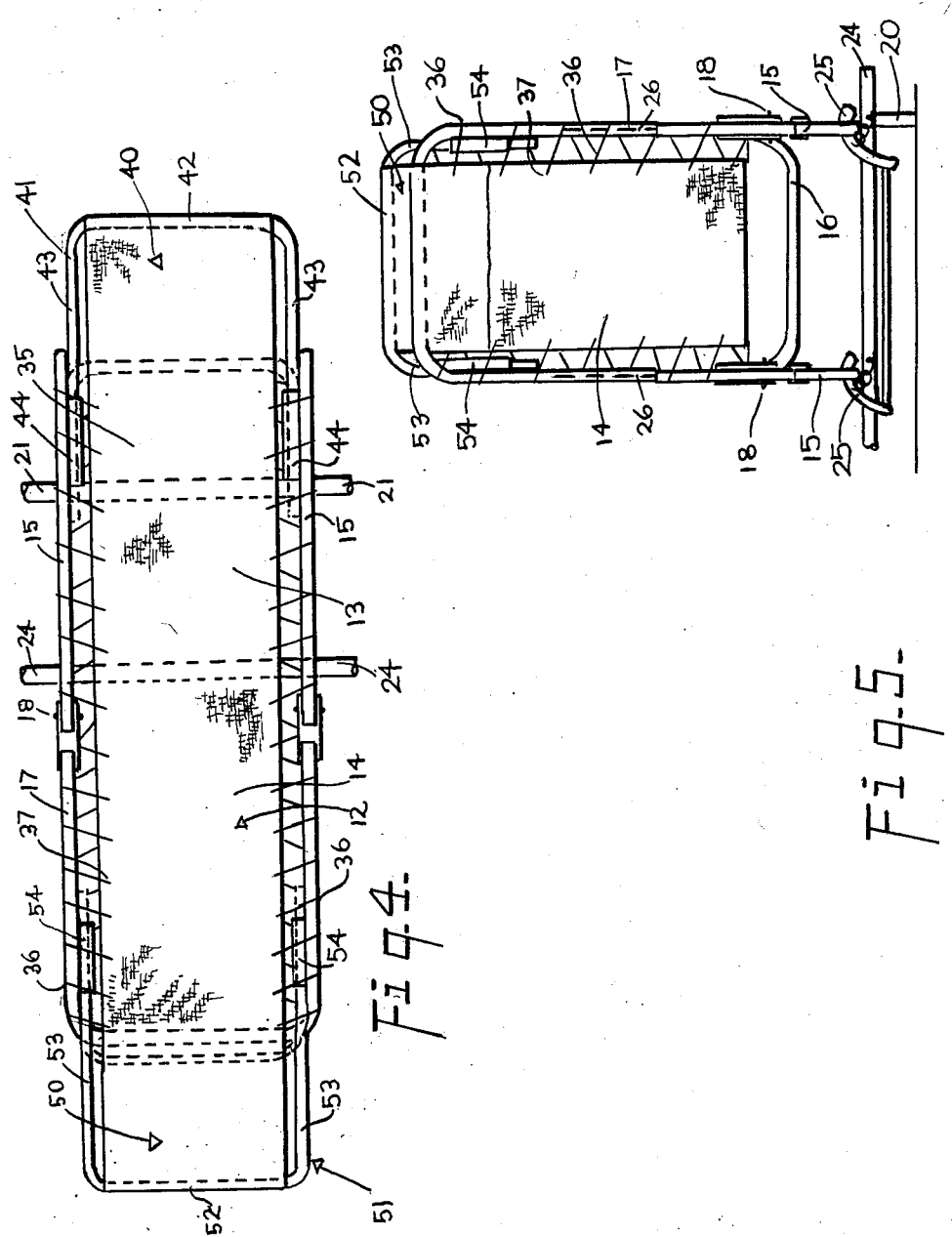
INVENTOR.
EUGENE D. WALKER
BY Cullen + Cantor
Attorneys

United States Patent Office 2,806,510
Patented Sept. 17, 1957

2,806,510
SEAT-BED

Eugene D. Walker, Detroit, Mich.

Application May 18, 1956, Serial No. 585,642

2 Claims. (Cl. 155—6)

This invention relates to a seat-bed and more particularly to a seat for use in vehicles such as automobiles and the like which seat may be converted into a bed or may be used normally for a seat for the vehicle. This application is a continuation-in-part of application Serial No. 481,203, filed January 11, 1955, now abandoned.

In the past, there has been numerous attempts made, particularly in the automotive industry, to form the front seat of an automobile vehicle, and in some cases the back seat, in such a manner that the seat may be folded to form a bed. However, in all of these attempts, because of the configuration of the seat cushions and the back and seat portions of the seats, when these seats are made into beds, the resulting bed is not in a flat plane but rather is bumpy and thus, first uncomfortable to lie down upon, and secondly is not of sufficient length to accommodate the average person.

Thus, it is an object of this invention to form a vehicle front seat wherein the back of the seat may be dropped down into the plane of the seat portion and wherein a planar bed is formed without disturbing the back seat in any way.

A further object of this invention is to form a seat for a vehicle wherein the back of the seat may be dropped into the plane of the front of the seat and wherein extensions are provided either for the front or seat portion or the rear or back portion or both, to extend the length of the bed to accommodate the average driver.

Yet another object of this invention is to so form a seat bed that when the back is placed in the plane of the seat portion, the entire plane of the bed is angled forwardly in the vehicle so that the person resting upon the bed has sufficient clearance between the dash-board of the vehicle and his body to comfortably rest upon the bed.

These and other objects of my invention will become apparent upon reading the following disclosure of which the attached drawings form a part.

Referring to the drawings, in which:

Fig. 2 is a side view of one of these seats drawn to a slightly enlarged scale;

Fig. 3 is a side view illustrating the seat as converted into a bed;

Fig. 4 shows a top view taken in the direction of arrow 4 of Fig. 3;

Fig. 5 illustrates a rear view of one seat and is taken in the direction of arrow 5 on Fig. 2.

Figure 1:
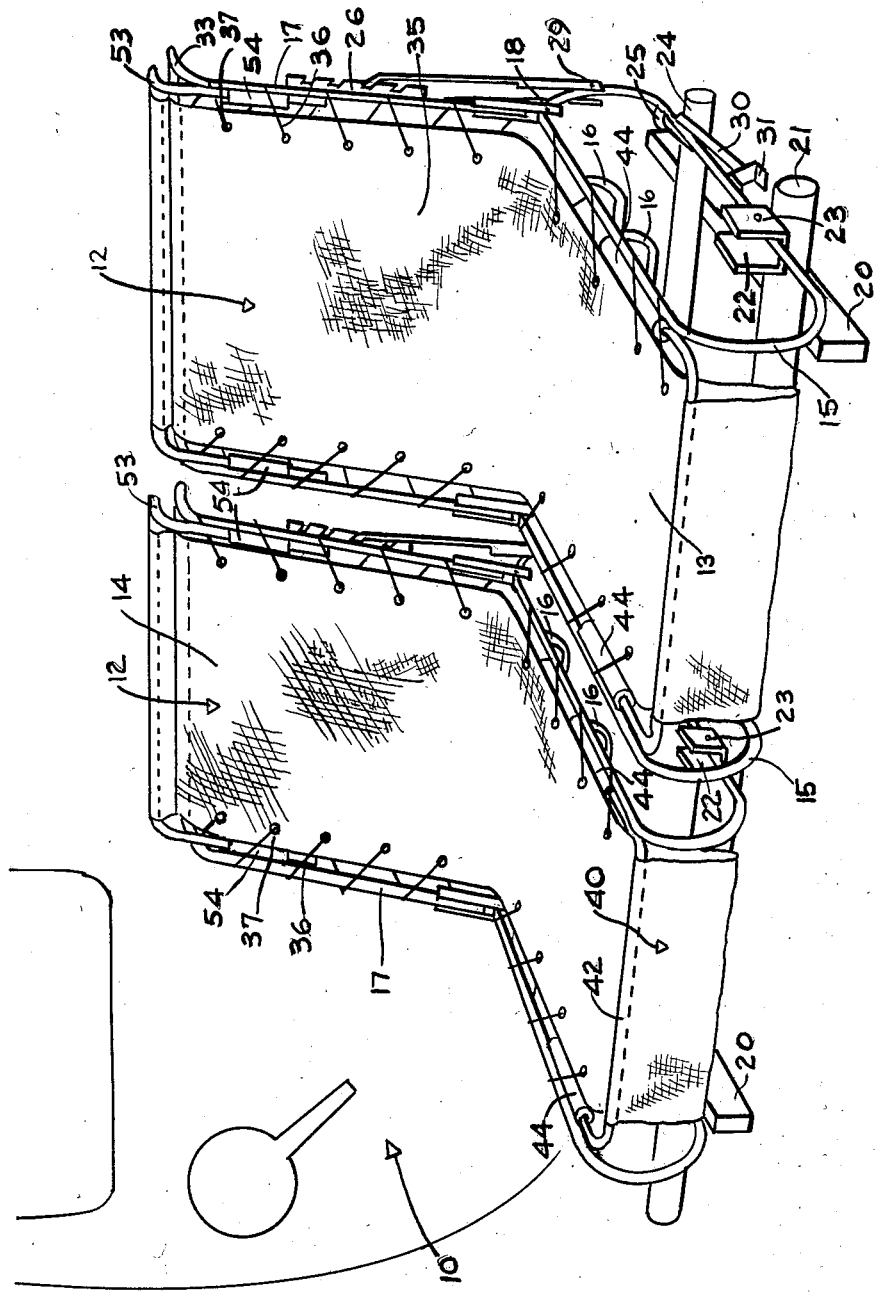
Fig. 1 is a perspective view of two seats of the construction disclosed herein as mounted in a vehicle such as an automobile.

With reference to Fig. 1, an interior of an automobile generally designated as 10 is illustrated to show the replacement of the conventional front seat of the automobile by the seats 12 of the construction disclosed herein. Each of these seats shown in Fig. 1 are formed in the same way so that only one of them will be described below.

Seat 12 comprises a seating portion 13 and a back portion 14. The seating portion consists of a pair of spaced frame members 15 which may be formed of tubular material arranged in flattened elliptical shape as illustrated in Figs. 2 and 3 of the drawings. The exact form of the frame members is not particularly critical, but is illustrated in the manner shown, since a high degree of strength can be obtained from a tubular metal construction formed in this manner. The two spaced frame members 15 are interconnected by struts 16 which are bent so as to be below the level of the top of the frame members.

The back portion 14 of the seat is formed of a U-shaped tubular frame 17, the legs of which being pivotally connected at 18 to the frame members of the seat portion.

The seat portion frame members 15 are supported upon blocks 20 secured to the floor of the vehicle upon which blocks a cross bar 21 is provided at the front of the seat portion frame members 15. A U-shaped bracket 22 is rigidly connected to the cross bar and pivotally connected at 23 to the frame members 15. The rear of the frame members rests upon a cross bar 24. This rear portion of the frame members may be loosely rested upon 24, or in the alternative, clamps in the form of swingable hooks 25 may be provided to hold down the back of the seat portion. (See Fig. 5.)

The frame 17 of the back portion 14 is held in adjustable upright positions by means of an adjustment bracket 26 having slots 27 formed therein into which the end of a brace arm 28 may be inserted, with the brace arm being pivotally connected at 29 to the frame members 15.

The view shown in Fig. 2 illustrates the seat as being used in a seating position wherein the seat portion 13 normally slants downwardly from front to rear as is conventional in most vehicles. However, when the seat is to be converted into a bed, it is desirable to raise the frame members 15 so that the tops thereof are arranged in a horizontal position. In fact, in the average automobile, it is desirable to raise the frame member so that the bed slants downwardly from rear to front whereby the occupant of the bed has sufficient clearance between the dash-board of the vehicle and his body. In order to thus adjust the seat portion, a swinging link 30, pivotally connected to the frame member 15, and having a U-shaped foot 31 arranged to fit over the cross bar 24, positions the seat either horizontally, or more desirably, at an angle downwardly from rear to front.

In order to make up the bed, the brace 29 is manually removed from the notches 27 of the bracket attachment 26 and the rear portion or back portion of the seat is dropped down until the base 33 of the U-shaped back frame rests upon the rear seat. In this position, the bed forms a planar surface. Note that the base 33 is preferably arranged offset to the plane of the frame 17.

In order to form the seat and back rest, a webbing 35, which may be formed of a single sheet of flexible material such as strong cloth or plastic is stretched between the frame members 15 and also between the legs of the back portion frame 17. This stretching may be accomplished by means of lacings 36, which lacings may be of wire, cord, or the like and which extend through eyelets 37 formed in the webbing 35.

Generally, the length of a bed so formed by means of the back and seat portion of the front seat would not be of sufficient length to hold the average size person. Thus, a front extension 40 is provided to extend the length of the bed. This front extension 40 is formed of a U-shaped tubular frame 41 having a base 42 and legs 43 telescoped into sockets 44 which are secured to the frame members 15.

The webbing 35 may be extended and secured to the base 42 of the extension 40 so that when the extension is pushed forwardly of the seat portion, the webbing 35 in the area between the front of the seat portion and the base 42 forms a taut support and a continuation of the bed formed by the seat and back. When the extension is not in use, the extension 40 is retracted into the sockets 44 so that the base 42 acts as the front cross bar of the seat and so that the material located between the front of the seat and the base 42 hangs loosely below the level of the seat as indicated in Fig. 1.

Likewise, in many instances, where the occupant of the vehicle is tall, even this front extension would not be sufficient to form a full length bed for the occupant. Thus, a back or rear extension 50 is provided and this also is formed of a U-shaped tubular frame 51 having a base 52 and legs 53 telescoped into sockets 54 connected to the legs of the back portion frame 17. Again the webbing 35 may be extended to connect with the base portion 52 so that when the rear extension is opened up, the bed continues for that length of the extension. Likewise, when the extension is retracted, the fabric between the base 52 and the top of the rear portion 14 hangs loosely therebetween.

It is also contemplated to use one rather than two seats for certain types of vehicles where only one seat is desirable. This one seat may be slidably mounted upon the cross-bar 21 by attaching the bracket 22 to the cross-bar by means of a slidable collar. Thus, the one seat may be positioned for driving or may be slid over to the passenger side of the vehicle.

It can be seen that the construction herein disclosed provides a seat which may be converted into a bed which is completely flat at all places and also is provided with extensions which extensions require no additional material but rather the material forming the surfaces of the extension is always carried and is formed integral with the seat itself. Where desired, seat cushions may be placed over the seat portion and against the back portion and these cushions may be removed when it is desired to make up the bed.

This invention may be further developed within the scope of the following attached claims. Accordingly, it is desired that the foregoing description be considered as illustrative of an operative embodiment of my invention and not in a strictly limiting sense.

Having fully described an operative embodiment of my invention, I now claim:

1. A seat bed for mounting within an automotive vehicle normally having a front and a rear seat, including a front seat arranged for normal use as a seat and being foldable, when desired, into a bed, said front seat comprising a seat portion and a back portion, said seat portion being formed of a pair of spaced frame members, each arranged in a vertical plane and each having an upper straight side, the two frame members being rigidly interconnected by rigid struts which are arranged beneath the plane formed by the two upper sides, a support arranged at the front of each frame to raise each frame front a distance above the level of the rear of each frame, the supports being rigidly connected to the floor upon which the seat bed is placed and the frame members being pivotally connected to said supports so that the rear of the frame members may be pivoted upwards to the level of or above the level of the front of the frames; a leg swingably connected to each frame member at the rear of each frame member to support the rear of the frame members in an upward position after the frame members are pivoted about their front support pivot connections; said back portion being formed of a continuous strip of rigid material bent into the form of an inverted U, with the base of the U bent offset rearwardly of the plane of the legs of the U, the free ends of the U legs each being pivotally connected to the rear of one of the frame members at their upper sides; adjustable locking means for locking the back in various upright angular positions relative to the seat, said locking means being releasable for allowing the back portion to pivot into a substantially horizontal position whereby the base of the U may be rested upon the rear seat of the vehicle and whereby the seat frame's upper sides may be pivoted into the same plane as the seat back by pivoting the frames about their pivot support connections and swinging the legs into a frame supporting position; a continuous flat sheet of flexible cloth stretched tightly between and having its edges secured to the frame member upper sides and also extending between the U-legs of the back and having its edges secured to these U-legs; a tubular socket secured to and aligned with each of the upper sides of the frame members and a rigid, U-shaped extension arranged with its legs telescoped into the sockets and the base of the U being arranged to form a front cross-bar between the frames and said cloth having an end connected to the extension base with a sufficient amount of slack being provided in the cloth so that the extension may be telescoped outwardly of the seat portion to increase the length of the combined seat and back portions.

2. A seat bed for mounting within an automotive vehicle normally having a front and a rear seat, including a front seat arranged for normal use as a seat and being foldable, when desired, into a bed, said front seat comprising a seat portion and a back portion, said seat portion being formed of a pair of spaced frame members, each arranged in a vertical plane and each having an upper straight side, the two frame members being rigidly interconnected by rigid struts which are arranged beneath the plane formed by the two upper sides, a support arranged at the front of each frame to raise each frame front a distance above the level of the rear of each frame, the supports being rigidly connected to the floor upon which the seat bed is placed and the frame members being pivotally connected to said supports so that the rear of the frame members may be pivoted upwards to the level of or above the level of the front of the frames; a leg swingably connected to each frame member at the rear of each frame member to support the rear of the frame members in an upward position after the frame members are pivoted about their front support pivot connections; said back portion being formed of a continuous strip of rigid material bent into the form of an inverted U, with the base of the U bent offset rearwardly of the plane of the legs of the U, the free ends of the U legs each being pivotally connected to the rear of one of the frame members at their upper sides; adjustable locking means for locking the back in various upright angular positions relative to the seat, said locking means being releasable for allowing the back portion to pivot into a substantially horizontal position whereby the base of the U may be rested upon the rear seat of the vehicle and whereby the seat frame's upper sides may be pivoted into the same plane as the seat back by pivoting the frames about their pivot support connections and swinging the legs into a frame supporting position; a continuous flat sheet of flexible cloth stretched tightly between and having its edges secured to the frame member upper sides and also extending between the U-legs of the back and having its edges secured to these U-legs; a tubular socket secured to and aligned with each of the legs of the U-shaped back portion near the base thereof, and a U-shaped extension formed of a rigid material and having the legs thereof telescopically inserted in said sockets, and the end of the cloth at the back portion being connected to the base of the U-shaped extension and there being sufficient slack provided at the cloth end so that the extension may be telescoped outwardly of the back portion to extend the length thereof.

References Cited in the file of this patent

UNITED STATES PATENTS

| 855,520 | Margolin et al. | June 4, 1907 |
| 1,498,874 | Hopkins | June 24, 1924 |
| 1,548,334 | Sebell | Aug. 4, 1925 |
| 1,668,167 | McKenna | May 1, 1928 |
| 2,520,094 | Hand | Aug. 22, 1950 |
| 2,627,299 | Martin | Feb. 3, 1953 |
| 2,738,829 | Rowe | Mar. 20, 1956 |
| 2,740,465 | Mugler | Apr. 3, 1956 |

FOREIGN PATENTS

| 169,537 | Switzerland | Aug. 1, 1934 |
| 703,111 | France | Feb. 2, 1931 |